United States Patent

[11] 3,541,924

| [72] | Inventor | Paul Gambin<br>Bregny, Viuz en Sallaz, France |
|---|---|---|
| [21] | Appl. No. | 750,164 |
| [22] | Filed | Aug. 5, 1968 |
| [45] | Patented | Nov. 24, 1970 |
| [73] | Assignee | Societe Anonyme Gambin S.A.<br>Viuz en Sallaz, France |
| [32] | Priority | Sept. 14, 1967 |
| [33] | | France |
| [31] | | No. 120946 |

[54] TRACER DEVICE FOR COPYING MACHINE-TOOLS
4 Claims, 2 Drawing Figs.

[52] U.S. Cl. .................................................. 90/62
[51] Int. Cl. .................................................. B23q 35/04
[50] Field of Search .............................. 90/13, 13.5, 62

[56] References Cited
UNITED STATES PATENTS

| 3,148,590 | 9/1964 | Bancroft et al. ............ | 90/62 |
| 3,252,379 | 5/1966 | Labruyere .................... | 90/62 |
| 3,255,670 | 6/1966 | Lasermann .................. | 90/62 |

*Primary Examiner*—Gerald A. Dost
*Attorney*—Holman, Glascock, Downing & Seebold ABSTRACT: A tracer control device for engraving and contour copying work having a tracer finger-carrying rod slidably mounted in a hub connected through a cardan joint to a sleeve slidably mounted in a casing. The hub is secured to a circular upper plate resting on an annular lower plate secured to the casing. An actuating member which controls a system of electric contacts is biassed against the inner end of the rod to urge an axial abutment of the rod against the hub and thereby to urge the upper plate against the lower plate.

Patented Nov. 24, 1970

3,541,924

INVENTOR
PAUL GAMBIN
By Glascock, Downing & Seebold.
ATTORNEYS

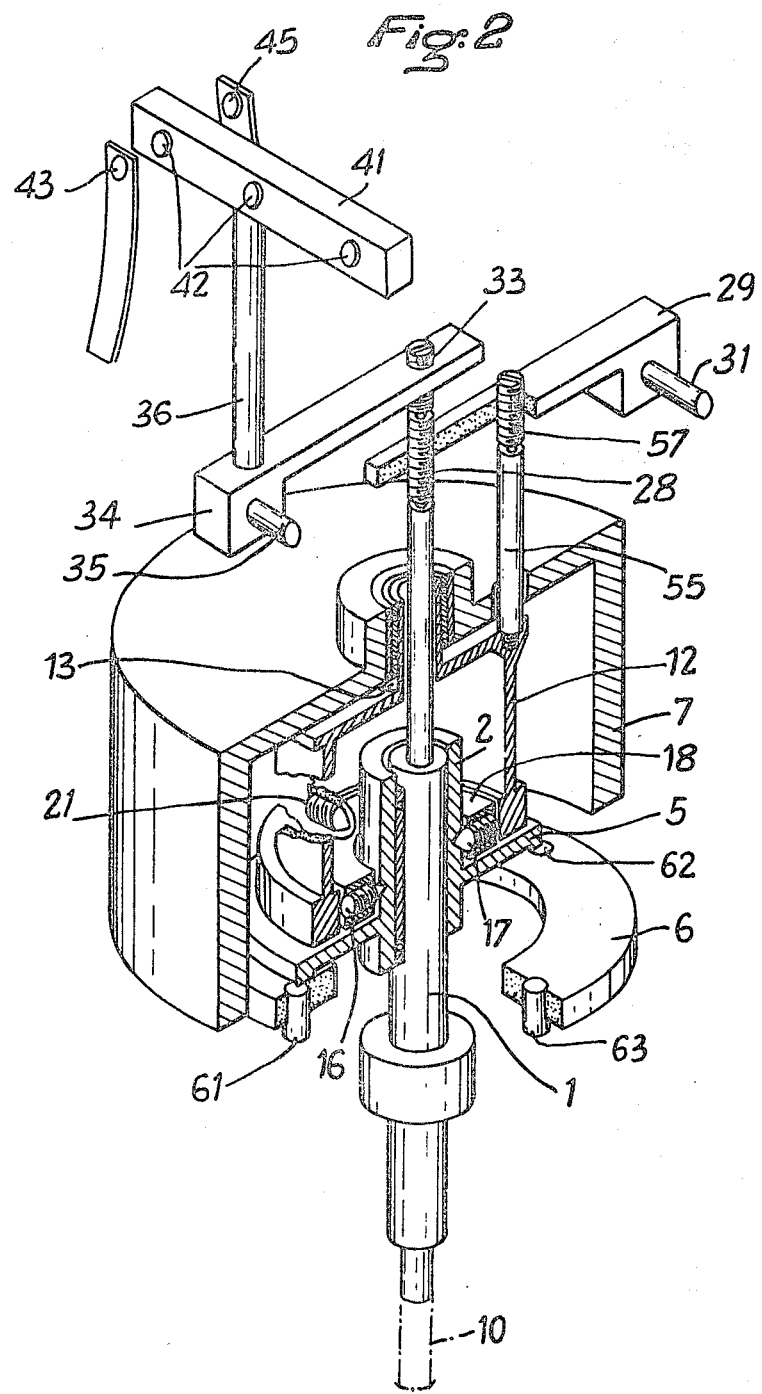

TRACER DEVICE FOR COPYING MACHINE-TOOLS

The present invention has for its object a tracer control device for a copying machine tool, which enables an engraving copying work to be carried out in response to axial displacements of the tracer finger as well as a contour copying work in response to lateral displacements of the tracer finger, and which requires no modification nor any adjustment to be effected in the device upon one kind of work being substituted to the other.

According to the main feature of the invention, the tracer device comprises a tracer finger-carrying rod slidably mounted in a hub connected through a universal joint to a sleeve which surrounds the tracer finger-carrying rod and which is slidably mounted in a casing, said hub being secured to a circular upper plate resting on a lower annular plate secured to the casing, whereas an actuating member for driving a system of electric contacts bears under the action of a restoring spring axially against the inner end of the tracer finger-carrying rod, in such a manner as to urge an axial abutment of the rod against the hub and thereby to urge the upper plate against the lower plate, whereby the aforesaid actuating member is moved either directly in response to an axial thrust of the copying tracer in engraving work or indirectly in response to an axial displacement of the tracer resulting from the tipping-up movement of the upper plate bearing against the lower plate when the tracer is being tilted in contour copying work.

Thus, an axial displacement of the tracer rod is obtained in engraving work as well as in contour work without any modification not any adjustment being required.

According to another feature of the invention an amplifying lever connected to the sliding sleeve and bearing on the casing is interposed between the aforesaid member for actuating the system of electric contacts and the corresponding end of the tracer finger-carrying rod.

Thus, it is possible for the device to have the same sensibility both in engraving and in contour work.

In a preferred embodiment, in the annular lower plate of insulating material, are secured direction electric contacts the active faces of which are coplanar and on which the conductive upper plate is resting, said contacts being provided for ensuring a preselection of the drive of the component movements necessary for the tracer to explore the contour of a master pattern. Thus, a copying contour operation may be carried out with a great accuracy since a signal is immediately available for preselecting the direction of the component movement necessary to explore the profile, as soon as the tracer has been moved laterally by a minute amount.

The following description and accompanying drawings show, by way of example, one embodiment of a tracer device according to the invention.

In these drawings:

FIG. 2 is diagrammatic perspective view, with portions taken away, of the principal parts of the device of FIG. 1.

Figure 1:
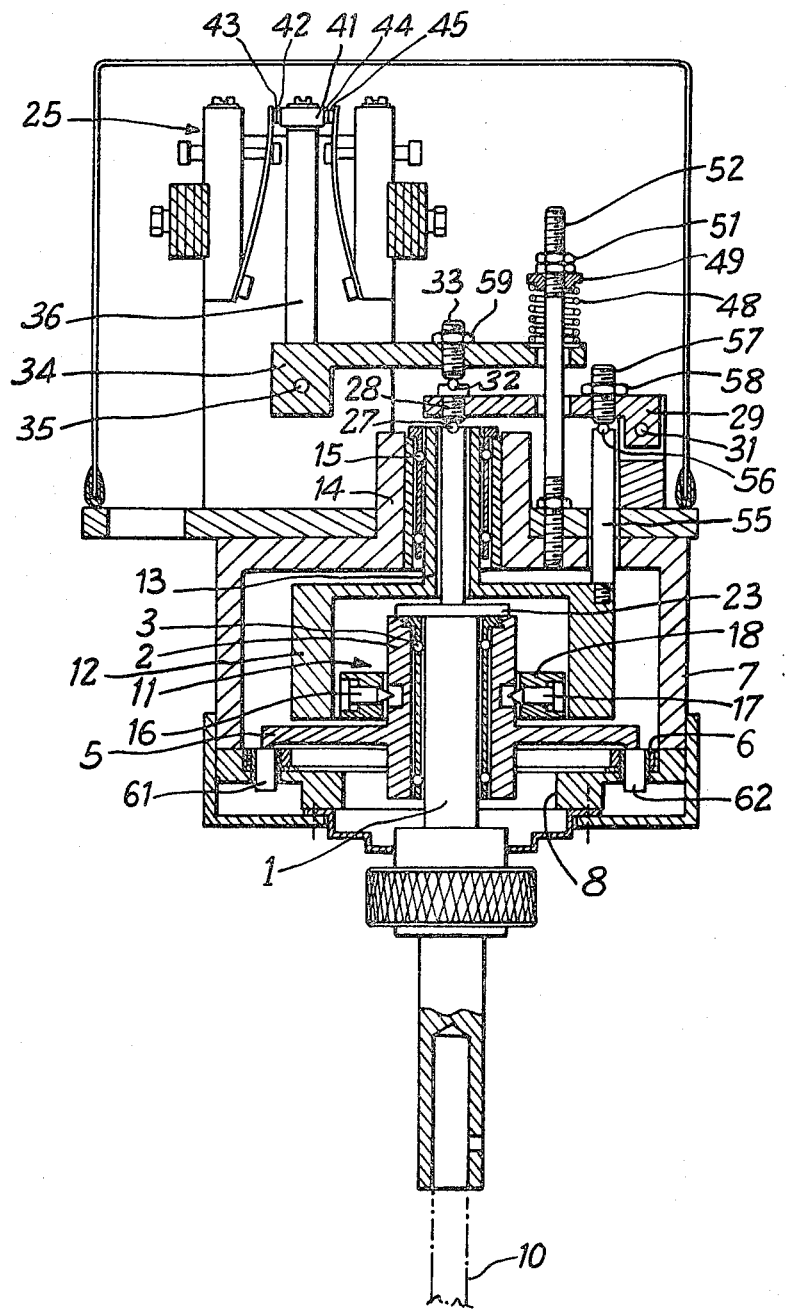
FIG. 1 shows the device in longitudinal section.

In the tracer device for copying machine-tools represented in the drawings, one end of a rod 1 is designated to receive a conventional tracer finger 10 while its other end is mounted for axial sliding movement in a hub 2, preferably through a ball cartridge 3.

The hub is secured to a circular upper plate 5 of the edge of which is resting on an annular lower plate 6 itself supported in the bottom of a casing designated as a whole by 7, the bottom of this casing is apertured, as indicated at 8, for letting the rod 1 protrude downwardly therethrough.

The hub 2 is connected through a universal joint 11 to a bell-shaped part 12 the apertured top of which carries a sleeve 13 which may slide axially in a bore of a central boss 14 of the casing 7, preferably through a ball cartridge 15. A substantial clearance is provided between the upper part of the tracer finger-carrying rod 1 and the sleeve 13.

The universal joint 11 is of any appropriate conventional type and comprises, in this example, in coplanar relation, two coaxial pivots 16, 17 carried by a ring 18 and engaged in two diametrically opposed recesses of the hub 2, as well as two further coaxial pivots, such as 21 (FIG. 2), carried by the bell-shaped part 12 and engaged in two diametrically opposed recesses in the annular part 18, the common geometrical axis of these two latter pivots being perpendicular to the common geometrical axis of both pivots 16 and 17.

The tracer finger-carrying rod 1, therefore, is able, to slide axially in the hub 2 and to tilt in any direction about the crossing point of the geometrical axes of the pivots of the universal joint, i.e. a fictive point of articulation carried by the bell-shaped part 12 which is able itself to slide axially with respect to the casing 7. This tilting movement of the rod 1 produces a corresponding tilt of the hub 2 and of the upper plate 5 which is secured thereto, so that the latter tips up slightly on the lower annular plate 6 and this movement is used for producing an axial rising movement of the tracer finger-carrying rod 1 by the fact that this latter is provided with a shoulder 23 which rests on the upper end of the hub 2.

The axial displacements of the rod 1 are used to actuate a system of electric contacts of any appropriate conventional type designated as a whole by 25, through a transmission which comprises: a ball 27 set in the upper end of the rod 1, a screw 28 the end of which rests against the ball 27, a lever 29 which carries the screw 28 and which is pivotally mounted in the casing 7 by means of a pin 31, a ball 32 set in the head of the screw 28, another screw 33 the end of which rests on the ball 32, a lever 34 which carries the screw 33 and which is pivotally mounted in the casing 7 by means of a pin 35, and a finger 36 secured to the lever 34. The finger 36 carries a rod 41 on which are secured, on one side, contacts such as 42 adapted to cooperate with adjustable stationary contacts such as 43, and on the other side contacts such as 44 adapted to cooperate with further adjustable stationary contacts such as 45.

The movable assembly is subjected to the action of a restoring spring 48 one end of which bears against the free end of the lever 34 and the other end against a shouldered washer 49 retained, by a nut and safety nut system 51, in an adjustable position on a screw threaded end portion of a rod 52 secured to the casing 7 by its other end purposely also screw threaded.

The strength of the spring 48 is, therefore, successively transmitted from the casing 7 to the following parts: lever 34, screw 33, ball 32, screw 28, ball 27, tracer finger-carrying rod 1, shoulder 23 of this rod, hub 2, upper plate 5 and annular lower plate 6 which itself rests in the bottom of the casing 7. The bell-shaped part 12 is axially positioned by its connection to the hub 2 through the universal joint 11.

The lever 34 which actuates the electric contact system 25 may be itself actuated, not only by the axial sliding movement of the tracer finger-carrying rod 1, but also by the axial sliding movement of the bell-shaped part 12, through a connection which comprises: a pusher rod 55 secured to the bell-shaped part 12, a ball 56 set in the end of said pusher rod, and a screw 57 mounted in the lever 29 and the end of which bears against the ball 56. The screw 57 is provided with a clamping safety nut 58. The screw 33 is also provided with a clamping safety nut 59. The distance between the axis of the pusher rod 55 and the pivoting pin 31 for the lever 29 is shorter than the distance between the axis of the screw 28 carried by the end of said lever and said pivoting pin 31 in such a manner that the axial displacements of the bell-shaped part 12 be amplified upon being transmitted to the lever 34 which actuates the electric contact system 25.

Finally, in the annular lower plate 6 are set flush electric contacts such as 61, 62, 63, regularly distributed about the geometrical axis of this plate on a theoretical circle having a diameter equal to the diameter of the circular upper plate 5. The lower annular plate 6 is made of an insulating material, whereas the upper plate 5 is made of metal and serves as an element for grounding the potentials brought to the different electric contacts such as 61, 62, 63. When the tracer rod assumes its neutral axial position represented, the plate 5 rests, by its edge, on these contacts which are flush with the upper surface of the annular plate 6.

The operation of the device is as follows:

When an engraving copying operation is being carried out, the tracer finger 10 and the rod 1 which carries it are subjected only to axial displacements which are transmitted to the lever 34 for actuating the electric contact system 25 through the ball 27, the screw 28, the ball 32 and the screw 33. The rising of the tracer results, therefore, into opening of the electric contacts such as 44, 45 and the closing of the further contacts such as 42, 43, which are utilized in any appropriate conventional manner for producing the necessary relative displacements of the master or pattern with respect to the tracer end of the work piece with respect to the tool.

When a contour copying operation is being carried out, the tracer 10 and the rod 1 which carries it are subjected to a tilting movement about the geometrical centre of the universal joint 11.

This movement results into an identical inclination of the hub 2 and the upper plate 5, which has two consequences: first of all, the upper plate 5 rises successively away from the electric contacts such as 61, 62, 63 carried by the annular lower plate 6, the utilization of the separation of these contacts being utilized for producing a preselection in the drive of the component movements necessary for the tracer to carry on scanning the pattern. The second consequence is an axial rising of the hub 2 resulting from the rocking movement of the upper plate 5 on the portion of its edge in contact with the annular lower plate 6, so that, through the universal joint 11, the bell-shaped part 12 is also raised in axial direction and, through the pusher rod 55, the ball 56, the screw 57, the lever 29, the screw 28, the ball 32, and the screw 33, ensures also pivoting movement of the lever 34 which actuates the electric contact system 25.

It will be noted that, when engraving work is carried out, any axial displacement of the tracer is transmitted entirely to the screw 33 carried by the lever 34 which actuates the contact system 35, whereas, when a contour work is being carried out a lateral displacement of the end of the tracer, for example by one-tenth mm., results, under the pivoting effect of the upper plate 5 about its edge, into a rising of the upper end of the rod, by a reduced quantity since the length of the rod 1 and of the tracer finger 10 generally will be, for instance, of the order of at least 200 mm., whereas the radius of the upper plate 5, in general, will be much smaller, however this reduced raising movement which is transmitted to the bell-shaped part 12 and to the pusher rod 55 will be 97 amplified by the connection formed by the lever 29, the amplification ratio of this connection having been selected to a value such that the screw 28 be raised finally by a quantity equal to the effective lateral displacement of the end of the tracer, namely one-tenth mm., in the example just contemplated.

The sensibility of the device is, therefore, substantially the same in the engraving copying work and in the contour copying work. Moreover, the electric contacts carried by the lower annular plate 6 make it possible, by a direction sensibilisation effect, to operate a preselection in the drive of the component movements necessary to scanning the contour of the pattern, and therefore to provide an accurate copying.

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

I claim:

1. A tracer device for a copying machine-tool, comprising:

a casing;

a lower annular plate secured to said casing and having a top face, an upper circular plate resting on said top face of said lower annular plate coaxially therewith;

a hub axially secured to said upper circular plate and having a top end face;

a tracer rod slidably mounted in said hub and extending throughout said hub and said lower annular plate, said tracer rod having an abutment to engage said top end face of said hub;

a sleeve slidably mounted in said casing coaxially with said tracer rod with a substantial clearance relative to said tracer rod;

a universal joint connection between said sleeve and said hub;

an electric contact system carried by said casing;

an actuating member movably supported on said casing for actuating said contact system;

spring means to urge said actuating member axially toward said tracer rod whereby said upper plate is urged against said lower plate under the action of said tracer rod abutment bearing against said hub.

2. A tracer according to claim 1, further comprising an amplifying lever pivotally mounted in said casing and having one end interposed between said actuating member and the corresponding end of the tracer rod, while another portion of said lever is operatively connected to said sliding sleeve.

3. A tracer device according to claim 1, further comprising an annular row of electric contacts secured in said top face of said lower plate on a theoretical circle having a diameter equal to the diameter of said upper circular plate, whereby said upper plate is adapted to rest by its edge on said electric contacts, said lower plate being of insulating material.

4. A tracer device according to claim 1, further comprising an amplifying lever pivotally mounted in said casing and having one end interposed between said actuating member and the corresponding end of the tracer rod, while another portion of said lever is operatively connected to said sliding sleeve, and an annular row of electric contacts secured in said top face of said lower plate on a theoretical circle having a diameter equal to the diameter of said upper circular plate, whereby said upper plate is adapted to rest by its edge on said electric contacts, said lower plate being of insulating material.